(12) United States Patent
Chou et al.

(10) Patent No.: US 7,715,131 B2
(45) Date of Patent: May 11, 2010

(54) VOICE COIL MOTOR ACTUATOR

(75) Inventors: Tai-Hsu Chou, Taipei Hsien (TW); Chia-Hung Liao, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/422,311

(22) Filed: Apr. 13, 2009

(65) Prior Publication Data

US 2009/0262438 A1 Oct. 22, 2009

(30) Foreign Application Priority Data

Apr. 18, 2008 (CN) .......................... 2008 1 0301207

(51) Int. Cl.
*G02B 7/02* (2006.01)
(52) U.S. Cl. ........................................ 359/824; 359/819
(58) Field of Classification Search ................. 359/811, 359/813, 814, 819, 823, 824
See application file for complete search history.

(56) References Cited

U.S. PATENT DOCUMENTS 7,486,882 B2 * 2/2009 Okita et al. .................. 396/55

\* cited by examiner

*Primary Examiner*—Timothy J Thompson
(74) *Attorney, Agent, or Firm*—Raymond J. Chew

(57) ABSTRACT

A voice coil motor (VCM) actuator includes a fixed bracket, a lens barrel, two flat spring plates, a support plate, a plurality of positioning pins, a plurality of coils, and a plurality of magnets. The fixed bracket includes a first chamber and a plurality of magnet mounting holes. A lens barrel is positioned in the first chamber. The flat spring plates and the support plate include a plurality of first locating holes and second locating holes. Two resilient heads are formed on two ends of each positioning pin. Each positioning pin interconnects between respective first locating holes of the flat spring plates and respective second locating holes of the support plate. A plurality of coils are wrapped around an outer wall of the lens barrel. A plurality of magnets is received in the magnet mounting holes.

17 Claims, 3 Drawing Sheets

VOICE COIL MOTOR ACTUATOR

BACKGROUND

1. Technical Field

The present disclosure relates to motor actuators, and particularly, to a voice coil motor (VCM) actuator.

2. Description of Related Art

Variable focal length lenses are widely used in optical systems. Optical systems incorporating such lenses can, for example, provide focused images of objects at varying distances without adjusting the distance between the lens and the image plane. Variable focal length lenses can also be used in optical systems that provide varying magnification without changing lenses.

Generally, an optical system includes an actuator, such as a step motor, to drive the lenses. However, the step motor is relatively large in volume. Use of the step motor requires a significant amount of space for movement of the lenses, which makes the optical system bulky.

The optical system often employs locating holes and locating pins to locate the actuator. However, use of the locating holes and locating pins requires adhesive for fastening, which complicates the combined optical system considerably.

Therefore, what is needed is a VCM actuator that can address the limitations described.

BRIEF DESCRIPTION OF THE DRAWINGS

Many aspects of a disclosed voice coil motor (VCM) actuator can be better understood with reference to the following drawings. The components in the drawings are not necessarily drawn to scale, the emphasis instead being placed upon clearly illustrating the principles of the present voice coil motor actuator. Moreover, in the drawings, like reference numerals designate corresponding parts throughout the several views.

DETAILED DESCRIPTION

Figure 1:
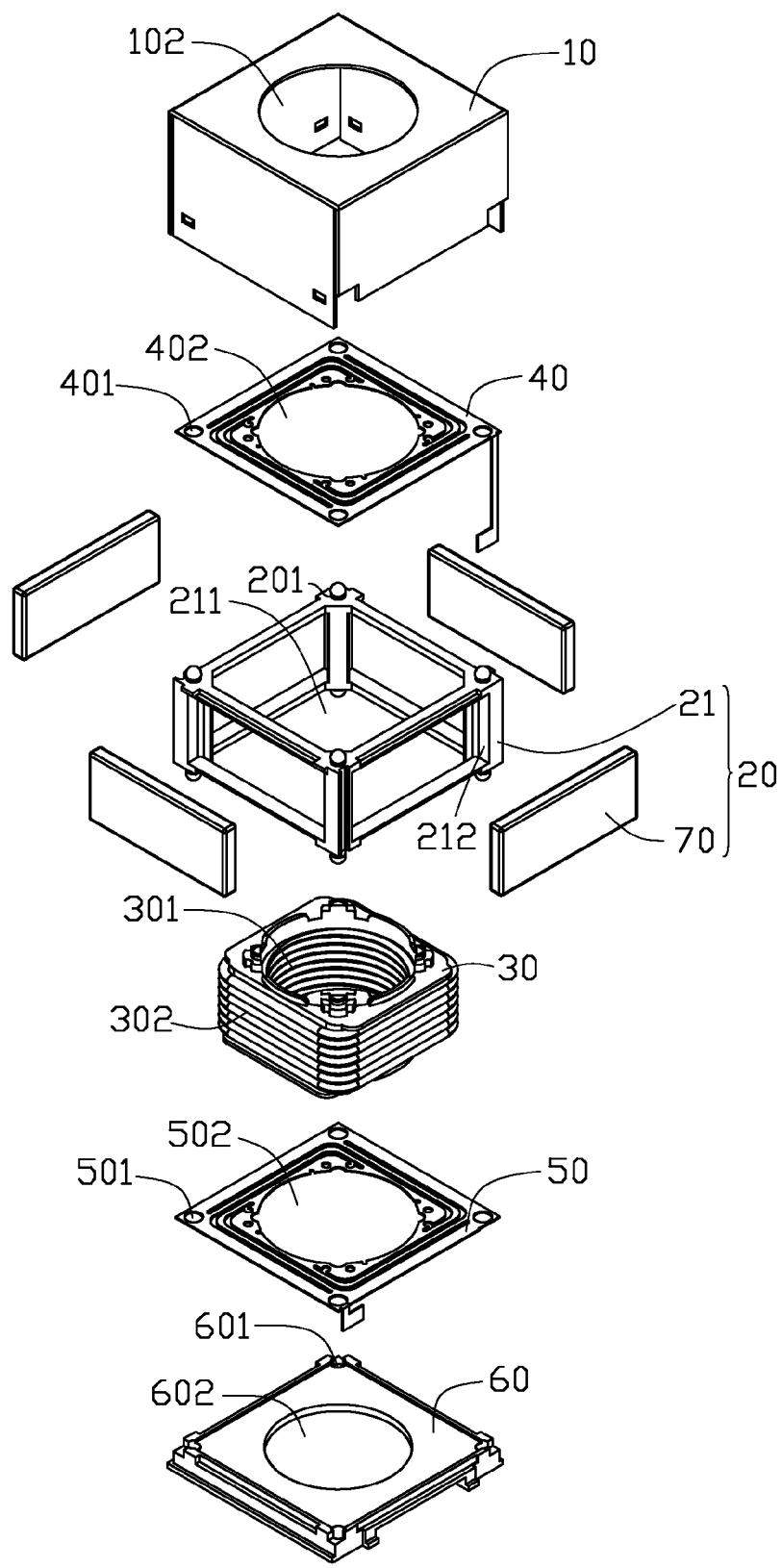
FIG. 1 is an exploded view of a VCM actuator.

FIG. 1 is an exploded view of a voice coil motor (VCM) actuator. The VCM actuator includes a shell 10, a fixed unit 20, a lens barrel 30, two flat spring plates 40, 50 and a support plate 60.

The shell 10 accommodates the fixed unit 20, the lens barrel 30, the two flat spring plates 40, 50 and the support plate 60 therein. A through hole 102 through which light passes is defined in the center of the shell 10.

The fixed unit 20 includes a fixed bracket 21 and a plurality of magnets 70. A first chamber 211 is defined in the fixed bracket 21. Four magnet mounting holes 212 are respectively formed in four sides of the fixed bracket 21. The magnet mounting holes 212 receive the magnets 70 and are in communication with the first chamber 211. Four positioning pins 201 respectively protrude vertically from the top and bottom sides of the fixed bracket 21 at each corner thereof. The positioning pins 201 locate and fix the two flat spring plates 40, 50 and the support plate 60 to the fixed bracket 21. The number of magnets 70 corresponds to that of the magnet mounting holes 212. The magnets 70 are respectively mounted in the magnet mounting holes 212. The fixed bracket 2 1 and the support plate 60 may be substantially square shaped, in one example.

The lens barrel 30 is positioned in the first chamber 211 and may be movable relative to the fixed unit 20. A second chamber 301 is defined in the lens barrel 30. The second chamber 301 accommodates lenses and filters (not shown). Coils 302 wrap around an outer wall of the lens barrel 30. When electric current is applied to the coils 302, the coils 302 are excited and act upon the magnets 70, thereby generating a magnetic force to linearly drive the lens barrel 30 along the central axis of the lens barrel 30. When electric current is cut off, the two flat spring plates 40, 50 impart a restoring force to the lens barrel 30, thereby returning the lens barrel 30 to its former position.

The flat spring plate 40 includes a plurality of first locating holes 401 and a through hole 402. A plurality of first locating holes 401 corresponding to respective positioning pins 201 are defined in each corner of the flat spring plate 40. The first locating holes 401 cooperate with the positioning pins 201 to locate and fix the flat spring plate 40 to the fixed bracket 21. A through hole 402 through which light passes is defined in the center of the flat spring plate 40.

The flat spring plate 50 includes a plurality of first locating holes 501 and a through hole 502. A plurality of first locating holes 501 corresponding to respective positioning pins 201 is defined in each corner of the flat spring plate 50. The first locating holes 501 cooperate with the positioning pins 201 to locate and fix the flat spring plate 50 to the fixed bracket 21. A through hole 502 through which light passes is defined in the center of the flat spring plate 50.

The support plate 60 includes a plurality of second locating holes 601 and a through hole 602. A plurality of second locating holes 601 corresponding to respective positioning pins 201 is defined in each corner of the support plate 60. The second locating holes 601 cooperate with the positioning pins 201 to locate and fix the support plate 60 to the fixed bracket 21. A through hole 602 through which light passes is defined in the center of the flat spring plate 60. The support plate 60 supports an image sensor (not shown).

Figure 2:
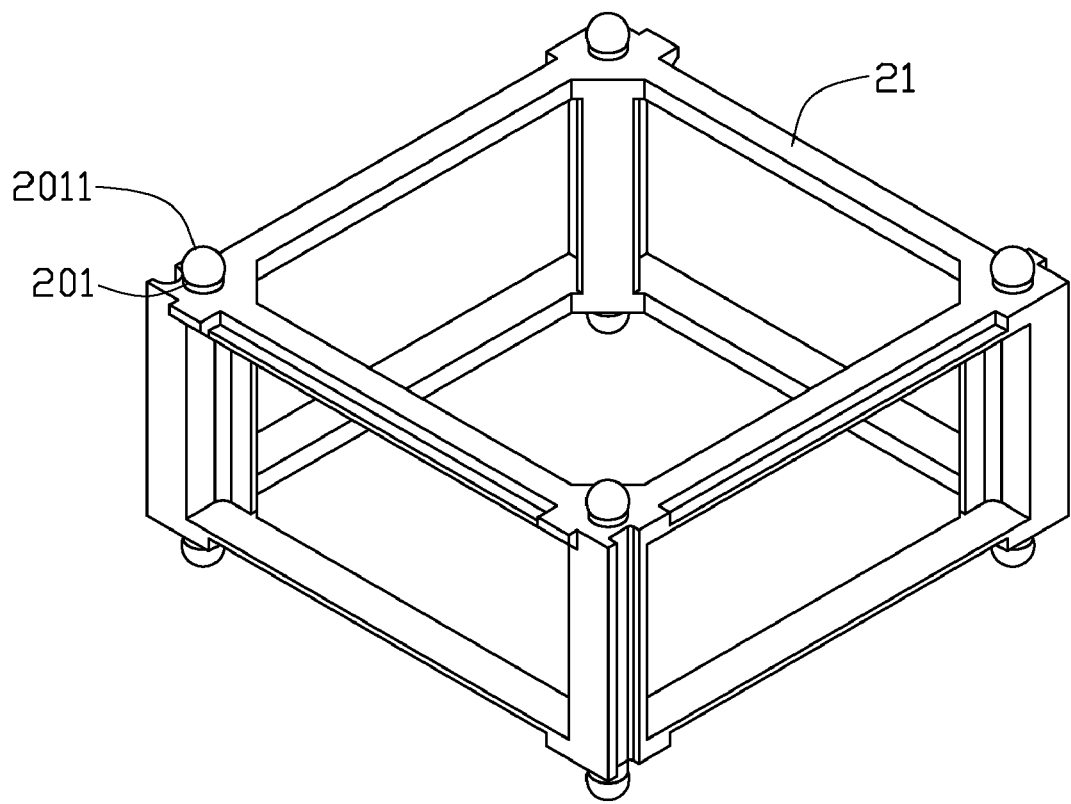
FIG. 2 is an enlarged view of a fixed bracket of FIG. 1.

FIG. 2 is an enlarged view of the fixed bracket 21 of FIG. 1. Each resilient head 2011 is formed on two ends of each positioning pin 201, wherein the largest area of the resilient heads 2011 exceeds the area of the first locating holes 401, 501, and the second locating holes 601. One end of the resilient head 2011 is squeezed through the corresponding first locating holes 401 of the flat spring plate 40 and fixed to the outer side of the flat spring plate 40 by elastic action of the resilient head 2011. The other end of the resilient head 2011 is squeezed through the corresponding first locating holes 501, and the second locating holes 601 and fixed to the outer side of the support plate 60 by elastic action of the resilient head 2011. The resilient heads 2011 cooperate with the positioning pins 201 to locate and fix two flat spring plates 40, 50 and the support plate 60 to the fixed bracket 21.

Figure 3:
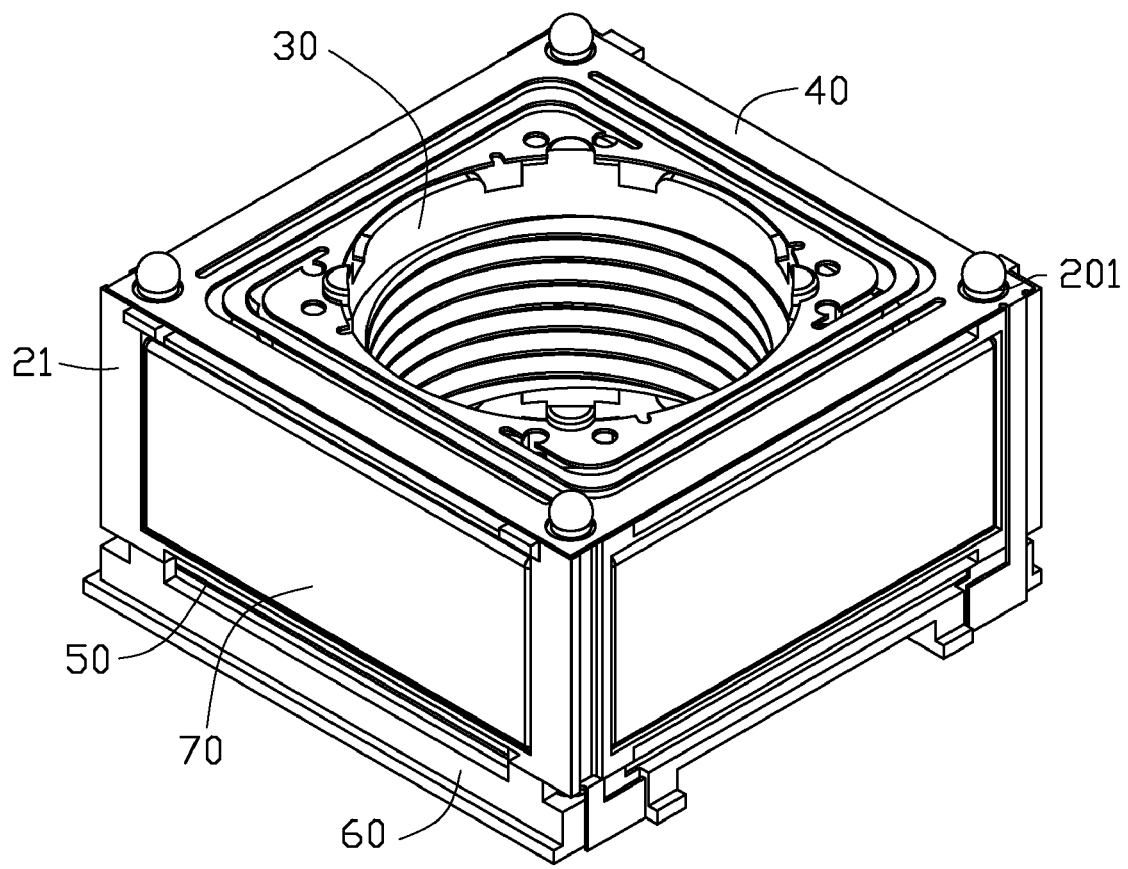
FIG. 3 is a schematic combination view of the VCM actuator of FIG. 1.

FIG. 3 is a schematic combination view of the VCM actuator of FIG. 1 without the shell 10. The lens barrel 30 is positioned in the fixed bracket 21. The magnets 70 are respectively set in four sides of the fixed bracket 21. The positioning pins 201 locate and fix the two flat spring plates 40, 50 and the support plate 60 to the fixed bracket 21.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A voice coil motor actuator for driving a lens, comprising:
- a substantially square-shaped fixed bracket comprising a first chamber and a plurality of magnet mounting holes defined in the fixed bracket;
- a lens barrel positioned in the first chamber;
- two flat spring plates, each of the two flat plates comprising a plurality of first locating holes;
- a substantially square-shaped support plate comprising a plurality of second locating holes;
- a plurality of positioning pins comprising two resilient heads formed on two ends of each positioning pin, wherein each positioning pin is interconnected between respective first locating holes of the flat spring plates and respective second locating holes of the support plate;
- a plurality of coils wrapped around an outer wall of the lens barrel; and
- a plurality of magnets received in the magnet mounting holes.

2. The voice coil motor actuator as claimed in claim 1, wherein the lens barrel comprises a second chamber defined in the lens barrel, the second chamber accommodating lenses and filters.

3. The voice coil motor actuator as claimed in claim 1, wherein the positioning pins protrude from top and bottom sides of the fixed bracket at each corner thereof.

4. The voice coil motor actuator as claimed in claim 1, wherein each of the two flat spring plates comprises a through hole defined in the center thereof so as to pass light through the through hole.

5. The voice coil motor actuator as claimed in claim 1, wherein the support plate comprises a through hole defined in the center thereof so as to pass light through the through hole.

6. The voice coil motor actuator as claimed in claim 1, wherein the largest area of the resilient heads exceeds the largest area of the first locating holes and the second locating holes.

7. The voice coil motor actuator as claimed in claim 1, wherein the first locating holes of each of the two flat spring plates are defined in each corner of each of the two flat spring plates.

8. The voice coil motor actuator as claimed in claim 1, wherein the second locating holes of the support plate are defined in each corner of the support plate.

9. A voice coil motor actuator for driving a lens, comprising:
- a substantially square-shaped fixed bracket comprising a first chamber and a plurality of magnet mounting holes defined in the fixed bracket;
- a lens barrel positioned in the first chamber;
- two flat spring plates, each of the two flat plates comprising a plurality of first locating holes;
- a substantially square-shaped support plate comprising a plurality of second locating holes;
- a plurality of positioning pins comprising two resilient heads formed on two ends of each positioning pin, wherein each positioning pin interconnects between respective first locating holes of the flat spring plates and respective second locating holes of the support plate;
- a plurality of coils wrapped around an outer wall of the lens barrel;
- a plurality of magnets received in the magnet mounting holes; and
- a shell accommodating the fixed bracket, the lens barrel, the two flat spring plates, the support plate, a plurality of positioning pins, a plurality of coils, and a plurality of magnets therein.

10. The voice coil motor actuator as claimed in claim 9, wherein the lens barrel comprises a second chamber defined in the lens barrel, the second chamber accommodating lenses and filters.

11. The voice coil motor actuator as claimed in claim 9, wherein the positioning pins protrude from top and bottom sides of the fixed bracket at each corner thereof.

12. The voice coil motor actuator as claimed in claim 9, wherein each of the two flat spring plates comprises a through hole defined in the center thereof so as to pass light through the through hole.

13. The voice coil motor actuator as claimed in claim 9, wherein the support plate comprises a through hole defined in the center thereof so as to pass light through the through hole.

14. The voice coil motor actuator as claimed in claim 9, wherein the largest area of the resilient heads exceeds the largest area of the first locating holes and the second locating holes.

15. The voice coil motor actuator as claimed in claim 9, wherein the first locating holes of each of the two flat spring plates are defined in each corner of each of the two flat spring plates.

16. The voice coil motor actuator as claimed in claim 9, wherein the second locating holes of the support plate are defined in each corner of the support plate.

17. The voice coil motor actuator as claimed in claim 9, wherein the shell comprises a through hole defined in the center of the shell so as to pass light through the through hole.

* * * * *